United States Patent
Sun

(10) Patent No.: US 9,900,307 B2
(45) Date of Patent: Feb. 20, 2018

(54) PORTABLE ELECTRONIC CARD SYSTEM AND VERIFYING METHOD THEREOF

(71) Applicant: Pinsheng Sun, Kaohsiung (TW)

(72) Inventor: Pinsheng Sun, Kaohsiung (TW)

( * ) Notice: Subject to any disclaimer, the term of this patent is extended or adjusted under 35 U.S.C. 154(b) by 0 days.

(21) Appl. No.: 15/396,131

(22) Filed: Dec. 30, 2016

(65) Prior Publication Data

US 2017/0111349 A1 Apr. 20, 2017

Related U.S. Application Data

(63) Continuation-in-part of application No. 14/192,146, filed on Feb. 27, 2014.

(51) Int. Cl.
*G06Q 20/34* (2012.01)
*H04L 29/06* (2006.01)
*G06K 19/10* (2006.01)
*G06F 7/12* (2006.01)

(52) U.S. Cl.
CPC ............ *H04L 63/083* (2013.01); *G06K 19/10* (2013.01); *G06Q 20/341* (2013.01); *G06Q 20/3552* (2013.01); *G06F 7/12* (2013.01); *G06Q 20/349* (2013.01)

(58) Field of Classification Search
CPC ............ G06Q 20/3552; G06Q 20/355; G06Q 20/341; G06Q 20/349; G06K 19/10; G06F 7/12
See application file for complete search history.

(56) References Cited

U.S. PATENT DOCUMENTS

| | | | | |
|---|---|---|---|---|
| 5,347,580 A * | 9/1994 | Molva | ............. | G06F 21/305 235/379 |
| 5,623,637 A * | 4/1997 | Jones | .................. | G06F 12/1466 710/13 |
| 5,914,471 A * | 6/1999 | Van De Pavert | ..... | G06Q 20/341 235/375 |
| 5,937,068 A * | 8/1999 | Audebert | ............. | G06Q 20/341 235/382 |
| 5,987,438 A * | 11/1999 | Nakano | ................ | G06K 7/0013 235/375 |
| 6,016,476 A * | 1/2000 | Maes | .................... | G06Q 20/108 705/18 |
| 6,367,011 B1 * | 4/2002 | Lee | ......................... | G06F 21/77 380/255 |
| 6,549,912 B1 * | 4/2003 | Chen | .................... | G06Q 20/105 |
| 7,266,695 B2 * | 9/2007 | Nakayama | .............. | G06F 21/31 713/155 |
| 8,800,009 B1 * | 8/2014 | Beda, III | ............ | H04L 63/0846 713/155 |

(Continued)

*Primary Examiner* — Nelson Giddins

(57) ABSTRACT

A portable electronic card system and a verifying method thereof are provided. The portable electronic card system includes: a portable personal electronic device, a rewritable card, and a writing device. The portable personal electronic device is used for obtaining a certificated code and a personal information from a remote controller. When a bidirectional verifying communication is performed between the remote controller and the portable electronic device to download the personal information, security code stored in the rewritable card be compared with security code stored in the portable electronic device for verifying and writing the personal information into the rewritable card, and another security code is generated to update or replace the original security code stored in the portable electronic device and the rewritable card.

16 Claims, 6 Drawing Sheets

(56) References Cited

U.S. PATENT DOCUMENTS

| | | | |
|---|---|---|---|
| 2001/0039583 A1* | 11/2001 | Nobakht | G06F 17/30884 709/227 |
| 2003/0005289 A1* | 1/2003 | Gougeon | G06Q 20/341 713/156 |
| 2004/0172535 A1* | 9/2004 | Jakobsson | G06Q 20/341 713/168 |
| 2006/0242404 A1* | 10/2006 | Su | G06Q 20/027 713/150 |
| 2009/0067630 A1* | 3/2009 | Daemen | G06Q 20/341 380/277 |
| 2009/0193151 A1* | 7/2009 | Adams | G06F 21/32 710/5 |
| 2010/0217709 A1* | 8/2010 | Aabye | G06Q 20/10 705/44 |
| 2010/0308109 A1* | 12/2010 | Maddocks | G06Q 20/341 235/382.5 |
| 2012/0217298 A1* | 8/2012 | Bonalle | G06K 19/06187 235/380 |
| 2012/0246713 A1* | 9/2012 | Liao | G06F 12/1433 726/16 |
| 2012/0284194 A1* | 11/2012 | Liu | G06Q 30/06 705/66 |
| 2013/0191279 A1* | 7/2013 | Calman | G06Q 20/3226 705/41 |
| 2015/0082042 A1* | 3/2015 | Hoornaert | G06F 21/34 713/172 |
| 2015/0270962 A1* | 9/2015 | Hautier | G06F 21/76 380/28 |
| 2015/0310439 A1* | 10/2015 | Powell | G06Q 20/409 705/44 |
| 2016/0098791 A1* | 4/2016 | Huang | G06Q 20/32 705/35 |
| 2016/0148085 A1* | 5/2016 | Gautier | G06K 19/073 235/492 |
| 2016/0149870 A1* | 5/2016 | Chou | G06F 21/445 713/168 |
| 2016/0275492 A1* | 9/2016 | Brickell | G06Q 20/3674 |
| 2017/0132623 A1* | 5/2017 | Choi | G06Q 20/3829 |

* cited by examiner

PORTABLE ELECTRONIC CARD SYSTEM AND VERIFYING METHOD THEREOF

This application is a continuation-in-part of application Ser. No. 14/192,146 filed on Feb. 27, 2014.

BACKGROUND OF THE INVENTION

Field of the Invention

The present disclosure relates to a portable electronic card system and a verifying method thereof.

Description of Related Art

A credit card is a payment card issued to users as a system of payment. It allows the cardholder to pay for goods and services based on the holder's promise to pay for them. The issuer of the card creates a revolving account and grants a line of credit to the cardholder, thus the cardholder can borrow money for payment to a merchant or as a cash advance to the user. The bank manufactures the credit card according to the application of people. People usually have several credit cards issued from various banks. It is not convenient to carry lots of credit cards in the wallet.

SUMMARY OF THE INVENTION

The present disclosure provides a portable electronic card system. The portable electronic card system includes: a portable personal electronic device, a rewritable card, and a writing device. The portable personal electronic device is used for obtaining a certificated code and a personal information from a database installed in a remote controller located out of the portable electronic device. The rewritable card has a rewritable storage device for storing the personal information. The writing device is electrically connected to the portable personal electronic device, and is used for writing the personal information into the rewritable card.

Wherein, a bidirectional verifying communication is performed between the remote controller and the portable electronic device to download the personal information from the remote controller by wireless communication.

Wherein, the portable electronic device comprises a code generator for generating a first security code to store in the portable electronic device and the rewritable card.

Wherein, when the personal information be downloaded to the portable electronic device from the remote controller after the bidirectional verifying communication, the first security code stored in the rewritable card be compared with the first security code stored in the portable electronic device for verifying and writing the personal information into the rewritable card, and the code generator generates a second security code to update or replace the first security code stored in the portable electronic device and the rewritable card.

Wherein, the first security code and the second security code are unknown to applicant.

The present disclosure further provides a verifying method of a portable electronic card system. The method includes: obtaining a certificated code and a personal information from a database of a remote controller by using a portable personal electronic device through a bidirectional verifying communication between the remote controller and the portable electronic device, wherein the remote controller is located out of the portable electronic device, and a first security code has been generated by a code generator for storing in the portable electronic device and a rewritable card; comparing the first security code stored in the rewritable card with the first security code stored in the portable electronic device for verifying when the personal information be downloaded to the portable electronic device from the remote controller after the bidirectional verifying communication; writing the personal information into the rewritable card by a writing device electrically connected to the portable electronic device; and generating a second security code by the code generator for updating or replacing the first security code stored in the portable electronic device and the rewritable card, wherein the first security code and the second security code are unknown to applicant.

DESCRIPTION OF EMBODIMENTS

Figure 1:
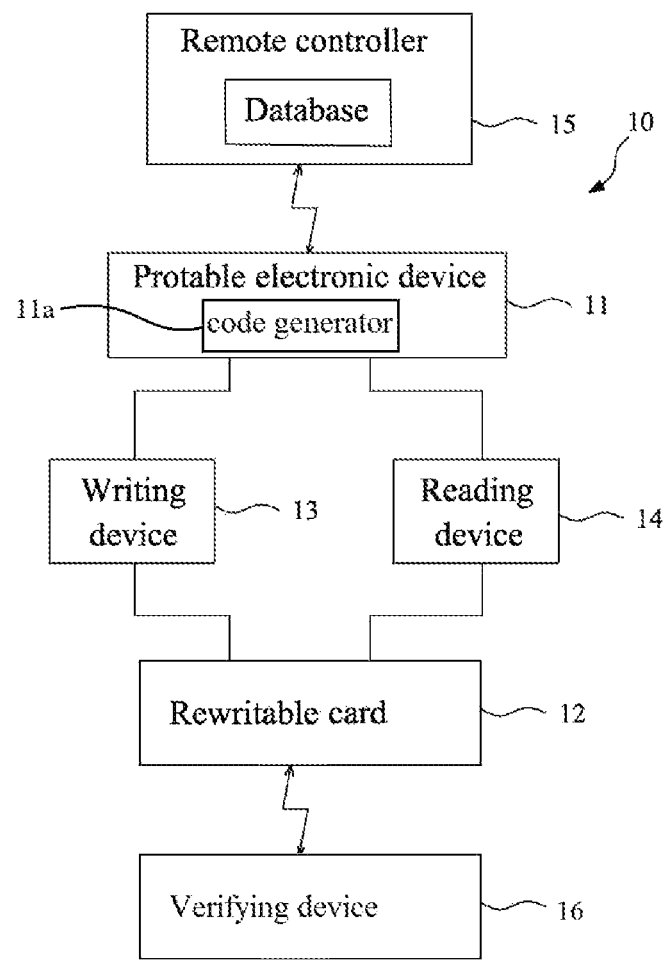
FIG. 1 is a schematic block diagram of a portable electronic card system in accordance with some embodiments.

Embodiments, or examples, of the disclosure illustrated in the drawings are now described using specific language. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates. Reference numerals may be repeated throughout the embodiments, but this does not necessarily require that feature(s) of one embodiment apply to another embodiment, even if they share the same reference numeral. It will be understood that when an element is referred to as being "connected to" or "coupled to" another element, it may be directly connected to or coupled to the other element, or intervening elements may be present.

FIG. 1 is a schematic block diagram of a portable electronic card system in accordance with some embodiments. The portable electronic card system can be used for a credit card, a banking card, an automatic teller machine card, membership card, a private identification card, a debit card, a key card or a hybrid smart card. In an embodiment, the portable electronic card system 10 includes: a portable electronic device 11, a rewritable card 12, a writing device 13 and a reading device 14. The portable electronic device 11 is, for example, a portable personal electronic device. The rewritable card 12 is, for example, a rewritable plastic card. The portable electronic device 11 is used for obtaining a certificated code and a personal information from a database installed in a remote controller 15 located out of the portable electronic device 11 by wireless communication. Wherein wireless communication is, for example, the internet. The portable electronic device 11 can be a smart phone, a tablet computer or a notebook computer.

In the present embodiment, the rewritable card 12 is, for example, a credit card. The remote controller 15 is, for example, located in a credit card company. The writing device 13 is electrically connected to the portable electronic device 11, and can write the personal information into the rewritable card 12. In addition, the portable electronic device 11 comprises a code generator 11a, wherein the code generator 11a is suitable for generating a first security code to store in the portable electronic device 11 and the rewritable card 12. The code generator 11a is, for example, a garbled generator.

Worth mention, in the present embodiment, a bidirectional verifying communication is need to perform between the remote controller 15 and the portable electronic device 11 to download the personal information from the remote controller 15 by wireless communication.

Further, when the bidirectional verifying communication is completed, the personal information can be downloaded to the portable electronic device 11 from the remote controller 15. And then, the first security code stored in the rewritable card 12 will compare with the first security code stored in the portable electronic device 11 for verifying. When the verification is passed, the personal information can be written into the rewritable card 12. Thereafter, the code generator 11a will generates a second security code to update or replace the first security code stored in the portable electronic device 11 and the rewritable card 12. In the present embodiment, the first security code and the second security code are unknown to applicant or user.

In detail, the rewritable card 12 has a serial number, and the portable electronic device 11 is used for inputting an application data by applicant and reading the serial number from the rewritable card 12, communicating with the remote controller 15 by wireless communication, and transmitting the application data and the serial number to the remote controller 15 for performing the bidirectional verifying communication between the remote controller 15 and the portable electronic device 11 to download the personal information from the remote controller 15 by wireless communication. Wherein, the serial number of the rewritable card 12 is, for example, a chip serial number and unknown to applicant.

Wherein, when the rewritable card 12 be written with the personal information by the writing device 13 in the first time after the bidirectional verifying communication, the serial number of the rewritable card 12 will be compared with the serial number stored in the portable electronic device 11 for verifying. When the verification is passed, the personal information can be written into the rewritable card 12. And then, the first security code just be generated by the code generator 11a and then be stored in the portable electronic device 11 and the rewritable card 12.

Besides, the reading device 14 is electrically connected to the portable electronic device 11 and can use to read the serial number of the rewritable card 12. Certainly, the reading device 14 also can use to read the personal information from the rewritable card. Wherein, the writing device 13 and the reading device 14 are, for example, embedded in the portable electronic device 11.

In one preferred embodiment, the first security code generated by the code generator 11a can be stored in the portable electronic device 11, the rewritable card 12, and the remote controller 15. Thus, when the bidirectional verifying communication is completed and the personal information is downloaded to the portable electronic device 11 from the remote controller 15, the first security code stored in the rewritable card 12 will compare with the first security code stored in the portable electronic device 11 or the first security code stored in the remote controller 15 for verifying. When the verification is passed, the personal information can be written into the rewritable card 12. Thereafter, the code generator 11a will generates the second security code to update or replace the first security code stored in the portable electronic device 11, the rewritable card 12, and the remote controller 15.

Similar to previous embodiment, in this embodiment, when the rewritable card 12 be written by the writing device 13 in the first time after the bidirectional verifying communication, the serial number of the rewritable card 12 be compared with the serial number stored in the portable electronic device 11 for verifying. When the verification is passed, the personal information can be written into the rewritable card 12. And then, the first security code just be generated by the code generator 11a and then be stored in the portable electronic device 11, the rewritable card 12, and the remote controller 15. Wherein, the first security code and the second security code generated by the code generator 11a are transmitted to the remote controller 15 by wireless communication.

From above, in the present invention, the bidirectional verifying communication comprises, for example, these steps: the portable electronic device 11 receives a password originally unknown to applicant after transmitting the application data and the serial number to the remote controller 15; and the portable electronic device 11 feedbacks the password originally unknown to applicant to the remote controller 15 for verification. Certainly, the bidirectional verifying communication also can comprises these steps: the portable electronic device receives a password and the certificated code after transmitting the application data and the serial number to the remote controller; and the portable electronic device feedbacks the password and the certificated code originally unknown to applicant to the remote controller for verification, wherein, the password and the certificated code are originally unknown to applicant.

In another preferred embodiment, the portable electronic card system 10 further comprises a verifying device 16 for performing a secured verification with the rewritable card 12 by a physically connected method or a wirelessly sensed method. In detail, in the present embodiment, the secured verification is performed by comparing the second security code stored in the rewritable card 12 and the second security code stored in the remote controller 15. Therefore, when the rewritable card 12 is applied to be a credit card, the second security code stored in the rewritable card 12 will be compared with the second security code stored in the remote controller 15 for the secured verification. When the secured verification is passed, the transaction of the credit card just can be approved. And then, the transaction of the credit card is completed. In other words, the present embodiment of the portable electronic card system 10 can improves card security of use greatly.

In particular, when the first security code stored in the remote controller 15 is not updated or replaced by the second security code, the secured verification is performed by comparing the first security code stored in the rewritable card 12 and the first security code stored in the remote controller 15.

Figure 2:
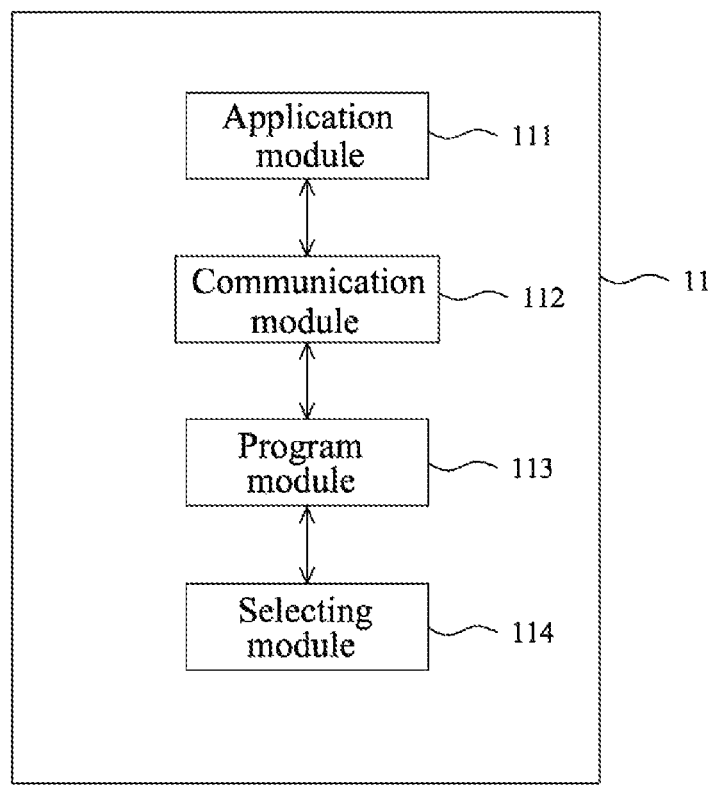
FIG. 2 is a schematic block diagram of a portable electronic device in accordance with some embodiments.

FIG. 2 is a schematic block diagram of a portable electronic device in accordance with some embodiments. Referring to FIG. 1 and FIG. 2, in one embodiment, the portable electronic device 11 includes, for examples, an application module 111, a communication module 112, a program module 113, and a selecting module 114. For example, the portable electronic card system 10 is used for a credit card, people firstly submits an application data including personal data to a credit card company. In other words, the rewritable card 12 is, for example, the credit card. In addition, the remote controller 15 is, for example, located in the credit card company. The application module 111 is used for inputting the application data by applicant or user and reading the serial number from the rewritable card 12. The communication module 112 is used for communicating with a remote controller 15 in the credit card company and transmitting the application data and the serial number to the remote controller 15 by wireless communication, like internet.

The credit card company verifies the application data after the credit card company receives the application data and the serial number. Then, the remote controller 15 generates a password for applicant after the remote controller 15 verifies the application data. The portable electronic device 11 receives the password from the remote controller 15. Wherein, the password is originally unknown to applicant. The program module 113 can be a software application used in the smart phone, tablet computer or notebook computer. The aforementioned code generator 11*a* is, for example, installed in the program module 113.

In addition, the program module 113 can be used for inputting the password and transmitting the password to the remote controller 15. Then, the program module 113 is used for receiving the certificated code for applicant from the remote controller 15 after the remote controller 15 verifies the password. The program module 113 can utilize the certificated code to communicate with the remote controller 15 and is used for downloading the personal information for applicant after the remote controller 15 verifies the certificated code. Wherein, the certificated code is originally unknown to applicant.

In detail, the personal information can be downloaded to the portable electronic device 11 from the remote controller 15 after verifications of the password and the certificated code originally unknown to applicant by the remote controller 15 through the bidirectional verifying communication between the remote controller 15 and the portable electronic device 11 and for storing the personal information and for transferring the personal information into the rewritable card as previously described.

In short, in the present embodiment, the bidirectional verifying communication comprising: when the portable electronic device 11 receives the password and the certificated code originally unknown to applicant, the program module 113 feedbacks the password and the certificated code originally unknown to applicant to the remote controller 15 for verification.

Furthermore, the portable electronic device 11 can download several personal information from several databases in several remote controllers of the various credit card companies according to the various applications of the user. Several downloaded personal information can be stored in the portable electronic device so that the user can the selecting module 114 of the portable electronic device 11 to select one of several personal information to be written into the rewritable card 12.

The rewritable card 12 has a rewritable storage device (not shown in the figures) for storing the personal information. The rewritable storage device of the rewritable card 12 can be at least one magnetic strip or at least one chip. The rewritable card 12 can further includes a screen (not shown in the figures) for showing some information, for example, bank card number or username. The rewritable card 12 can further includes a area for showing a picture of the user. The rewritable card 12 can further have a bar code or QR code.

The rewritable card 12 can be used for a credit card, a banking card, an automatic teller machine card, membership card, a private identification card, a debit card, a key card or a hybrid smart card.

The writing device 13 electrically connects to the portable electronic device 11, and is used for writing the personal information into the rewritable card 12. In an embodiment, the writing device 13 electrically connects to the portable electronic device 11 by wireless communication. For example, the personal information from the remote controller 15 in the credit card company can be transmitted to the writing device 13, then be written into the rewritable card 12 by the writing device 13. The rewritable card 12 can be used as a credit card.

Figure 3:
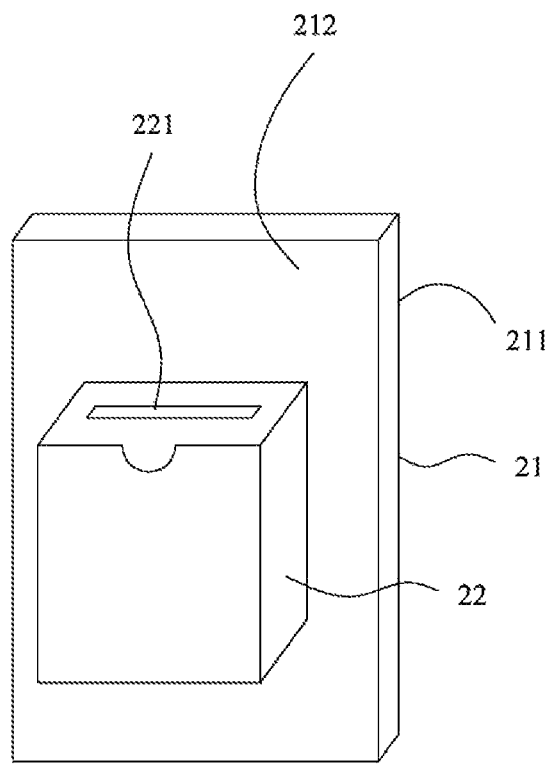
FIG. 3 shows the writing device and the portable electronic device in accordance with some embodiments.

FIG. 3 shows the writing device and the portable electronic device in accordance with some embodiments. In an embodiment, the portable electronic device 21 is a smart phone, and the portable electronic device 21 includes a front surface 211 and a back surface 212. The front surface 211 is a touch panel. The writing device 22 is mounted on the back surface 212, and is electrically connected to the portable electronic device 21. The writing device 22 includes a slot 221 for accommodating the rewritable card. The rewritable card can be disposed in the slot 221 to receive the personal information.

Using the portable electronic card system, the portable electronic device can obtain several personal information from several databases, then the writing device can write one of the several personal information into the rewritable card according to the choice of the user. For example, if the user wants to use the credit card allowed by X credit card company, the user can utilizes the portable electronic device to select X personal information from X credit card company and transmit X personal information to the writing device. Then, the writing device writes X personal information into the rewritable card. The rewritable card can be used as a credit card allowed by X credit card company to pay for goods and services.

Furthermore, if the user wants to use the credit card allowed by Y credit card company, the user can utilizes the portable electronic device to select Y personal information from Y credit card company and transmit Y personal information to the writing device. Then, the writing device writes Y personal information into the rewritable card and cover X personal information. The rewritable card is changed as a credit card allowed by Y credit card company, and can be used to pay for goods and services.

Therefore, the rewritable card can be used as a credit card allowed by various credit card companies. The user does not need to carry lots of credit cards, and can utilizes the rewritable card of the portable electronic card system in place of several credit cards. Further, the rewritable card can be configured to be a banking card, an automatic teller machine card, membership card, a private identification card, a debit card or a key card according to various personal information.

Referring to FIG. 1, the reading device 14 electrically connects to the portable electronic device 11, and is used for reading the personal information from the rewritable card 12. In an embodiment, the reading device 14 electrically connects to the portable electronic device 11 by wireless communication. The personal information can be transmitted to the portable electronic device 11. The user can know the personal information in the rewritable card 12 by the portable electronic device 11, and determine whether the personal information should be changed.

In an preferred embodiment, the writing device 13 and the reading device 14 are embedded in the portable electronic device 11, and are parts of the portable electronic device 11. Referring to FIG. 3, the reading device can be embedded in the writing device 22, and is a part of the writing device 22. That is, the writing device 22 having the reading device can read the personal information in the rewritable card.

Figure 4:
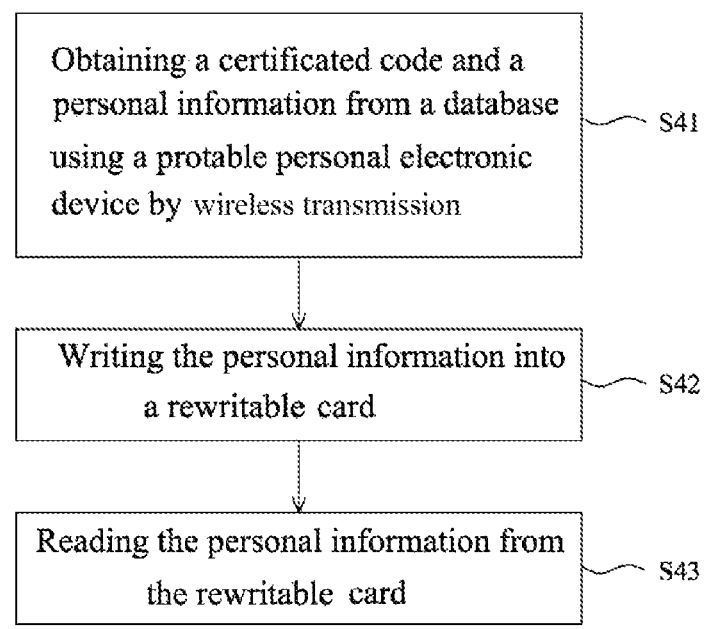
FIG. 4 is a flow diagram of a verifying method of a portable electronic card system in accordance with some embodiments.

FIG. 4 is a flow diagram of a verifying method of a portable electronic card system in accordance with some embodiments. Referring to step S41, a certificated code and a personal information are obtained from a database using a portable electronic device by wireless communication, like internet. Referring to step S42, the personal information is written into a rewritable card using a writing device. The rewritable card having the personal information is performed. Referring to step S43, the method of the embodiment further includes reading the personal information from the rewritable card.

Figure 5:
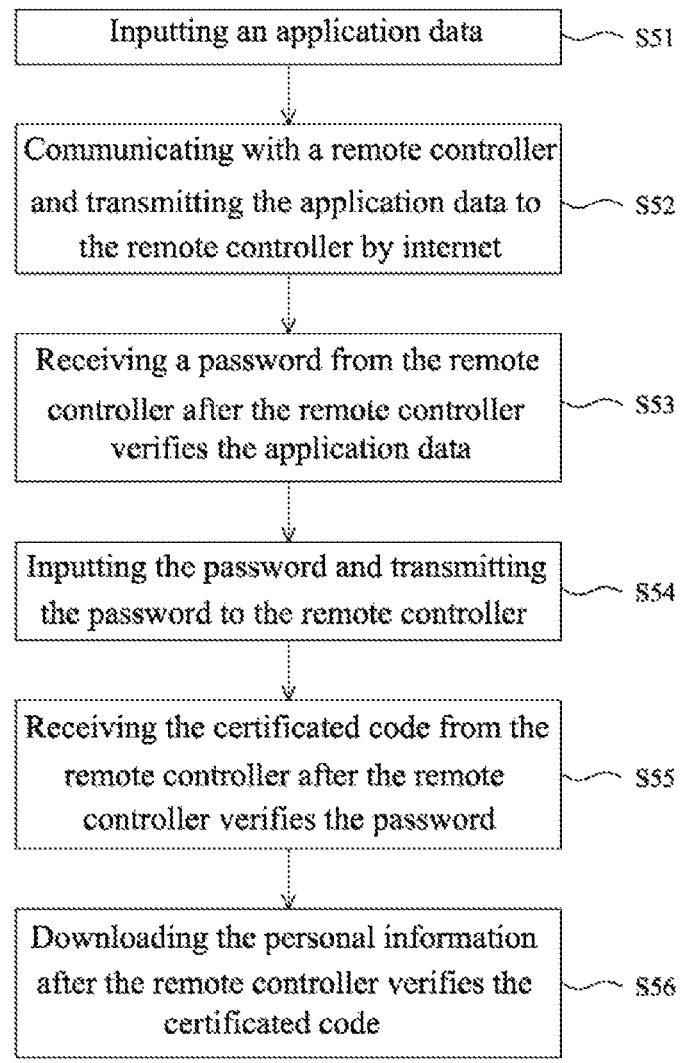
FIG. 5 is a flow diagram of a verifying method for obtaining a personal information in accordance with some embodiments.

FIG. 5 is a flow diagram of a verifying method for obtaining a personal information in accordance with some embodiments. Referring to step S51, the user inputs an application data by the portable electronic device or by filling in an application list. Referring to step S52, a remote controller is communicated and the application data is transmitted to the remote controller by internet. Referring to step S53, a password is received from the remote controller after the remote controller verifies the application data. Referring to step S54, the password is inputted and is transmitted the remote controller. Referring to step S55, the certificated code is received from the remote controller after the remote controller verifies the password. Referring to step S56, the personal information is downloaded after the remote controller verifies the certificated code. Therefore, the portable electronic device can obtain personal information from the remote controller, and the personal information is written into the rewritable card.

Figure 6:
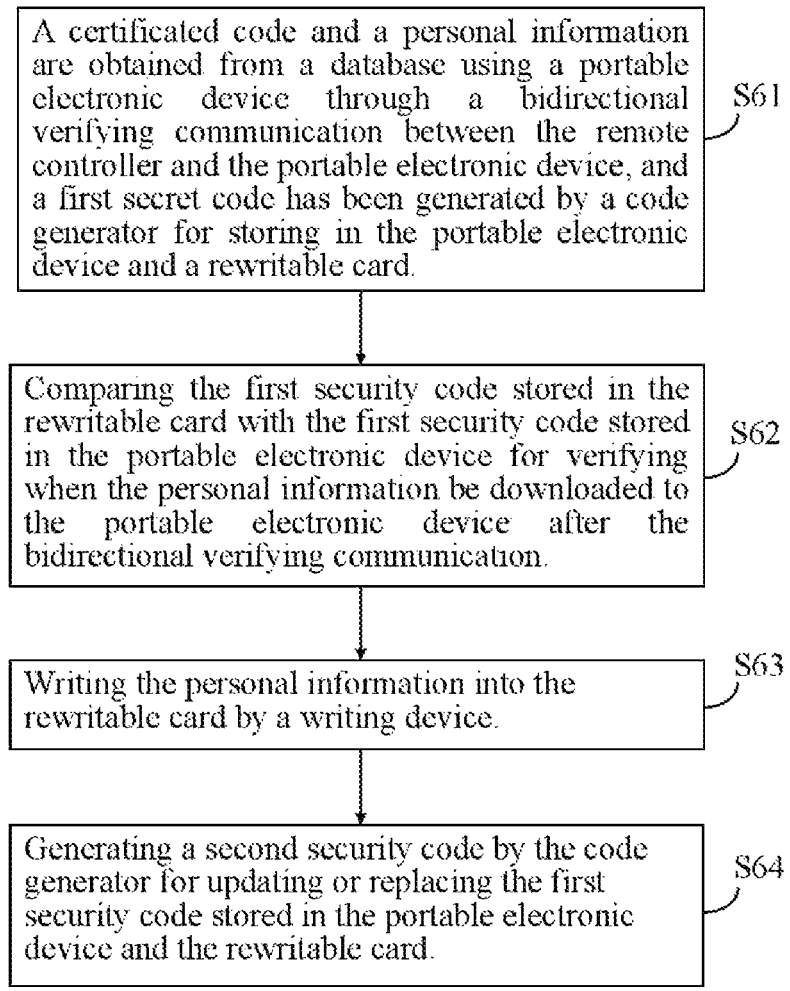
FIG. 6 is a flow diagram of a verifying method of another portable electronic card system in accordance with some embodiments.

FIG. 6 is a flow diagram of another verifying method of a portable electronic card system in accordance with some embodiments. Referring to step S61, a certificated code and a personal information are obtained from a database using a portable electronic device through a bidirectional verifying communication between the remote controller and the portable electronic device, and a first security code has been generated by a code generator for storing in the portable electronic device and a rewritable card. Referring to step S62, comparing the first security code stored in the rewritable card with the first security code stored in the portable electronic device for verifying when the personal information be downloaded to the portable electronic device after the bidirectional verifying communication. Referring to step S63, writing the personal information into the rewritable card by a writing device. Referring to step S64, generating a second security code by the code generator for updating or replacing the first security code stored in the portable electronic device and the rewritable card.

In this embodiment, the rewritable card has a serial number unknown to applicant, and the step of obtaining the certificated code and the personal information from the database includes: using the portable electronic device to input an application data by applicant and reading the serial number from the rewritable card; communicating with the portable electronic device and the remote controller by wireless communication; and transmitting the application data and the serial number located the portable electronic device to the remote controller for performing the bidirectional verifying communication between the remote controller and the portable electronic device to download the personal information from the remote controller by wireless communication.

In another preferred embodiment, the first security code generated by the code generator also can be stored in the portable electronic device, the rewritable card, and the remote controller. In the verifying method of the portable electronic card system in this embodiment, the first security code stored in the rewritable card be compared with the first security code stored in the portable electronic device or the first security code stored in the remote controller for verifying. When the verification is passed, the personal information can be written into the rewritable card. Thereafter, the code generator will generates the second security code to update or replace the first security code stored in the portable electronic device, the rewritable card, and the remote controller. Wherein, the first security code and the second security code generated by the code generator are transmitted to the remote controller by wireless communication.

In anther preferred embodiment, the verifying method of the portable electronic card system further comprises a step for performing a secured verification between a verifying device and the rewritable card by a physically connected method or a wirelessly sensed method. Wherein, the secured verification be performed by comparing the second security code stored in the rewritable card and the second security code stored in the remote controller. On the other hand, when the first security code stored in the remote controller is not updated or replaced by the second security code, the secured verification be performed by comparing the first security code stored in the rewritable card and the first security code stored in the remote controller.

While several embodiments of the present disclosure have been illustrated and described, various modifications and improvements can be made by those skilled in the art. The embodiments of the present disclosure are therefore described in an illustrative but not in a restrictive sense. It is intended that the present disclosure should not be limited to the particular forms as illustrated and that all modifications which maintain the spirit and scope of the present disclosure are within the scope defined in the appended claims.

What is claimed is:

1. A portable electronic card system, comprising:
   a portable electronic device, for obtaining a certificated code and a personal information from a database installed in a remote controller located outside of the portable electronic device; and
   a writing device, electrically connecting to the portable electronic device and writing the personal information into a rewritable card;
   wherein a bidirectional verifying communication is performed between the remote controller and the portable electronic device to download the personal information from the remote controller by wireless communication;
   wherein the portable electronic device comprises a code generator for generating a first security code to store in the portable electronic device and the rewritable card;
   wherein when the personal information is downloaded to the portable electronic device from the remote controller after the bidirectional verifying communication, the first security code stored in the rewritable card is compared with the first security code stored in the portable electronic device for verifying and writing the personal information into the rewritable card, and the code generator generates a second security code to update or replace the first security code stored in the portable electronic device and the rewritable card;

wherein the first security code and the second security code are unknown to applicant;

wherein the rewritable card has a serial number, and the portable electronic device is used for inputting an application data by applicant and reading the serial number from the rewritable card, communicating with the remote controller by wireless communication, and transmitting the application data and the serial number to the remote controller for performing the bidirectional verifying communication between the remote controller and the portable electronic device to download the personal information from the remote controller by wireless communication;

wherein the serial number of the rewritable card is unknown to applicant;

wherein the portable electronic device comprising:

an application module for inputting the application data by applicant and reading the serial number from the rewritable card;

a communication module for communicating with the remote controller and transmitting the application data and the serial number to the remote controller by wireless communication, and then receiving a password from the remote controller when the application data is verified by the remote controller, wherein the password is originally unknown to applicant; and a program module used to input the password originally unknown to applicant and transmit the password to the remote controller, and then receiving the certificated code from the remote controller when the password is verified by the remote controller, and then transmitting the certificated code to the remote controller for verification, wherein the certificated code is originally unknown to applicant, wherein the personal information is downloaded to the portable electronic device from the remote controller after verifications of the password and the certificated code originally unknown to applicant by the remote controller through the bidirectional verifying communication between the remote controller and the portable electronic device and for storing the personal information and for transferring the personal information into the rewritable card;

wherein the bidirectional verifying communication comprising: when the portable electronic device receives the password and the certificated code originally unknown to applicant, the program module feedbacks the password and the certificated code originally unknown to applicant to the remote controller for verification.

2. The portable electronic card system according to claim 1, wherein when the rewritable card is written by the writing device in the first time after the bidirectional verifying communication, the serial number of the rewritable card is compared with the serial number stored in the portable electronic device for verifying and writing the personal information into the rewritable card, and the code generator generates the first security code for storing in the portable electronic device and the rewritable card.

3. The portable electronic card system according to claim 1, wherein the code generator generates the first security code to store in the portable electronic device, the rewritable card, and the remote controller;

wherein when the personal information is downloaded to the portable electronic device from the remote controller after the bidirectional verifying communication, the first security code stored in the rewritable card is compared with the first security code stored in the portable electronic device or the first security code stored in the remote controller for verifying and writing the personal information into the rewritable card, and the code generator generates the second security code to update or replace the first security code stored in the portable electronic device, the rewritable card, and the remote controller.

4. The portable electronic card system according to claim 3, wherein when the rewritable card is written by the writing device in the first time after the bidirectional verifying communication, the serial number of the rewritable card is compared with the serial number stored in the portable electronic device for verifying and writing the personal information into the rewritable card, and the code generator generates the first security code for storing in the portable electronic device, the rewritable card, and the remote controller;

wherein the first security code and the second security code generated by the code generator are transmitted to the remote controller by wireless communication.

5. The portable electronic card system according to claim 3, further comprising a verifying device for performing a secured verification with the rewritable card by a physically connected method or a wirelessly sensed method.

6. The portable electronic card system according to claim 5, wherein the secured verification is performed by comparing the second security code stored in the rewritable card and the second security code stored in the remote controller;

wherein when the first security code stored in the remote controller is not updated or replaced by the second security code, the secured verification is performed by comparing the first security code stored in the rewritable card and the first security code stored in the remote controller.

7. The portable electronic card system according to claim 1, wherein the bidirectional verifying communication comprising:

the portable electronic device receives a password originally unknown to applicant after transmitting the application data and the serial number to the remote controller; and the portable electronic device feedbacks the password originally unknown to applicant to the remote controller for verification.

8. The portable electronic card system according to claim 1, wherein the bidirectional verifying communication comprising:

the portable electronic device receives a password and the certificated code after transmitting the application data and the serial number to the remote controller; and the portable electronic device feedbacks the password and the certificated code originally unknown to applicant to the remote controller for verification;

wherein, the password and the certificated code are originally unknown to applicant.

9. The portable electronic card system according to claim 1, further comprising a reading device, electrically connecting to the portable electronic device and reading the personal information from the rewritable card;

wherein the writing device and the reading device are embedded in the portable electronic device.

10. The portable electronic card system according to claim 1, wherein the rewritable card has a rewritable storage device for storing the personal information, the rewritable storage device of the rewritable card comprises at least one magnetic strip or at least one chip, and the rewritable card is a rewritable plastic card.

11. The portable electronic card system according to claim 1, wherein the writing device comprises a slot for accommodating the rewritable card, and the rewritable card is used for a credit card, a banking card, an automatic teller machine card, membership card, a private identification card, a debit card or a key card.

12. A verifying method of a portable electronic card system, comprising:
    obtaining a certificated code and a personal information from a database of a remote controller by using a portable electronic device through a bidirectional verifying communication between the remote controller and the portable electronic device, wherein the remote controller is located outside of the portable electronic device, and a first security code has been generated by a code generator for storing in the portable electronic device and a rewritable card;
    comparing the first security code stored in the rewritable card with the first security code stored in the portable electronic device for verifying when the personal information is downloaded to the portable electronic device from the remote controller after the bidirectional verifying communication;
    writing the personal information into the rewritable card by a writing device electrically connected to the portable electronic device; and
    generating a second security code by the code generator for updating or replacing the first security code stored in the portable electronic device and the rewritable card, wherein the first security code and the second security code are unknown to applicant;
    wherein the rewritable card has a serial number unknown to applicant, and the step of obtaining the certificated code and the personal information from the database includes:
    using the portable electronic device to input an application data by applicant and reading the serial number from the rewritable card;
    communicating with the portable electronic device and the remote controller by wireless communication; and
    transmitting the application data and the serial number located the portable electronic device to the remote controller for performing the bidirectional verifying communication between the remote controller and the portable electronic device to download the personal information from the remote controller by wireless communication;
    wherein the portable electronic device comprising:
    an application module for inputting the application data by applicant and reading the serial number from the rewritable card;
    a communication module for communicating with the remote controller and transmitting the application data and the serial number to the remote controller by wireless communication, and then receiving a password from the remote controller when the application data is verified by the remote controller, wherein the password is originally unknown to applicant; and
    a program module used to input the password originally unknown to applicant and transmit the password to the remote controller, and then receiving the certificated code from the remote controller when the password is verified by the remote controller, and then transmitting the certificated code to the remote controller for verification, wherein the certificated code is originally unknown to applicant,
    wherein the personal information is downloaded to the portable electronic device from the remote controller after verifications of the password and the certificated code originally unknown to applicant by the remote controller through the bidirectional verifying communication between the remote controller and the portable electronic device and for storing the personal information and for transferring the personal information into the rewritable card;
    wherein the bidirectional verifying communication comprising: when the portable electronic device receives the password and the certificated code originally unknown to applicant, the program module feedbacks the password and the certificated code originally unknown to applicant to the remote controller for verification.

13. The method according to claim 12, wherein when the rewritable card is written by the writing device in the first time after the bidirectional verifying communication, the serial number of the rewritable card is compared with the serial number stored in the portable electronic device for verifying and writing the personal information into the rewritable card, and the code generator generates the first security code for storing in the portable electronic device and the rewritable card.

14. The method according to claim 12, wherein the code generator generates the first security code to store in the portable electronic device, the rewritable card, and the remote controller;
    wherein when the personal information is downloaded to the portable electronic device from the remote controller after the bidirectional verifying communication, the first security code stored in the rewritable card is compared with the first security code stored in the portable electronic device or the first security code stored in the remote controller for verifying and writing the personal information into the rewritable card, and the code generator generates the second security code to update or replace the first security code stored in the portable electronic device, the rewritable card, and the remote controller;
    wherein when the rewritable card is written by the writing device in the first time after the bidirectional verifying communication, the serial number of the rewritable card is compared with the serial number stored in the portable electronic device for verifying and writing the personal information into the rewritable card, and the code generator generates the first security code for storing in the portable electronic device, the rewritable card, and the remote controller;
    wherein the first security code and the second security code generated by the code generator are transmitted to the remote controller by wireless communication.

15. The method according to claim 14, further comprising a step for performing a secured verification between a verifying device and the rewritable card by a physically connected method or a wirelessly sensed method;
    wherein the secured verification is performed by comparing the second security code stored in the rewritable card and the second security code stored in the remote controller;
    wherein when the first security code stored in the remote controller is not updated or replaced by the second security code, the secured verification is performed by comparing the first security code stored in the rewritable card and the first security code stored in the remote controller.

16. The method according to claim 12, wherein the bidirectional verifying communication comprising:
the portable electronic device receives a password and the certificated code after transmitting the application data and the serial number to the remote controller; and
the portable electronic device feedbacks the password and the certificated code originally unknown to applicant to the remote controller for verification;
wherein, the password and the certificated code are originally unknown to applicant.

* * * * *